E. T. SILVIUS.
CREDIT ACCOUNT REGISTER.
APPLICATION FILED SEPT. 7, 1912.
1,238,208.
Patented Aug. 28, 1917.
2 SHEETS—SHEET 2.
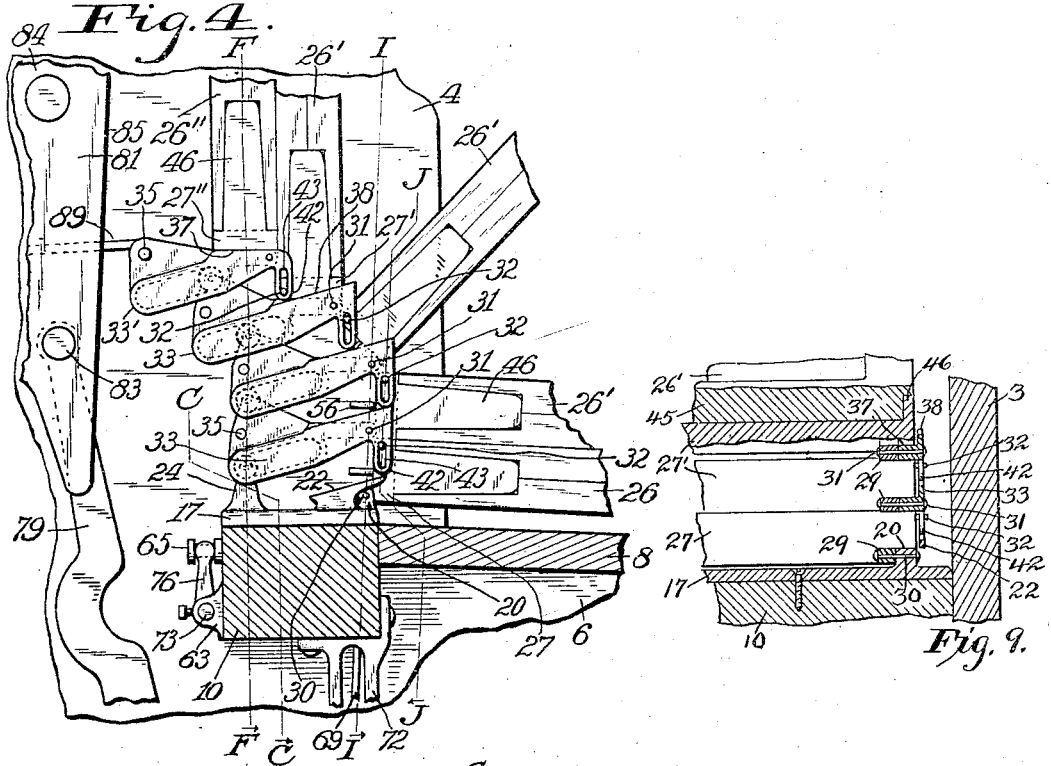
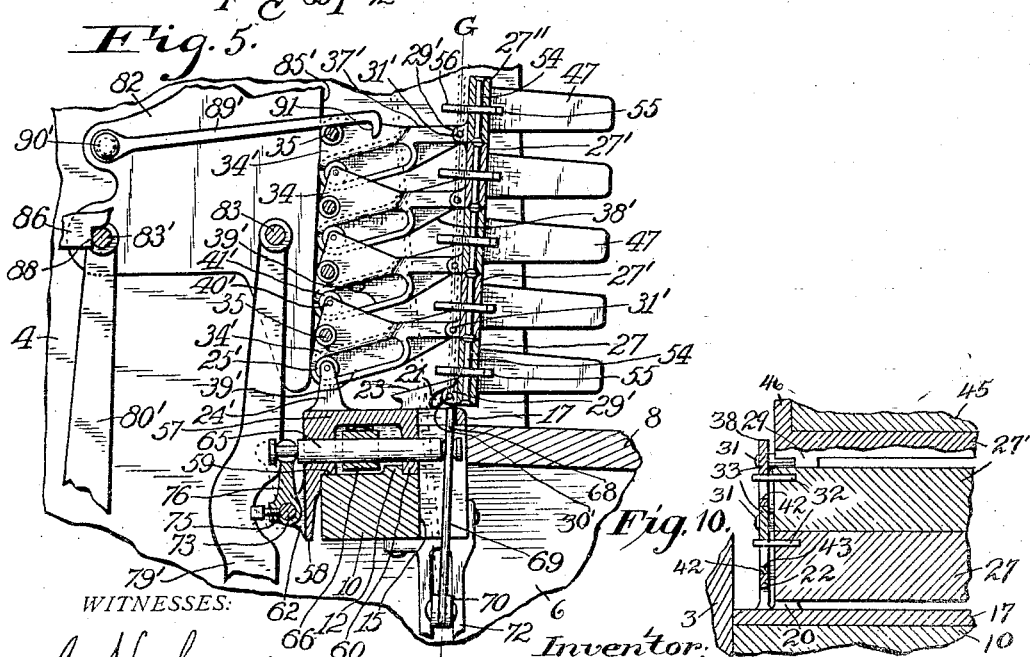

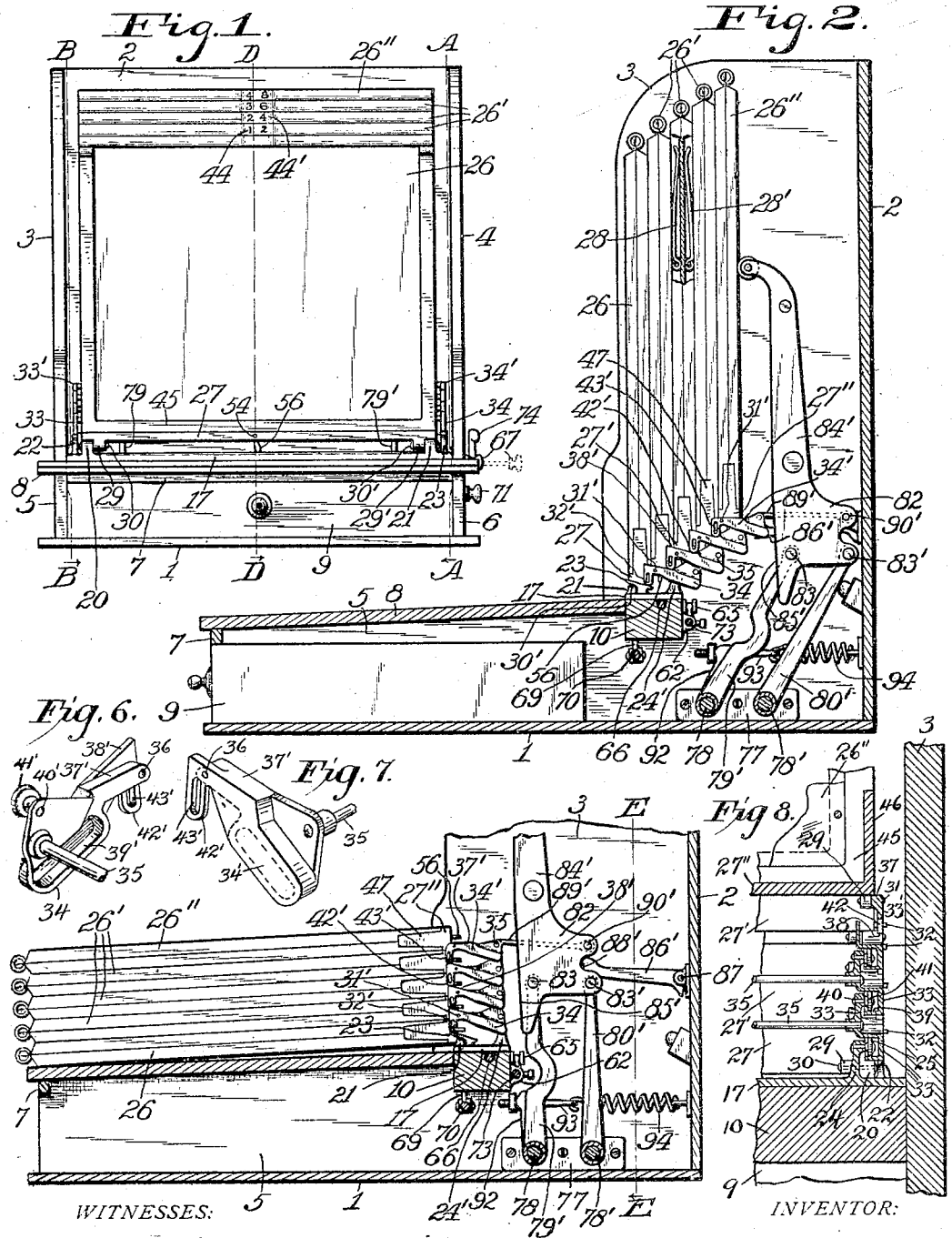

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

CREDIT-ACCOUNT REGISTER.

1,238,208.  Specification of Letters Patent.  Patented Aug. 28, 1917.

Application filed September 7, 1912. Serial No. 719,167.

*To all whom it may concern:*

Be it known that I, ELLIS T. SILVIUS, a citizen of the United States, residing at Indianapolis, in the county of Marion and State of Indiana, have invented a new and useful Credit-Account Register, of which the following is a specification, reference being had to the accompanying drawings and to the letters and figures of reference marked thereon.

This invention relates to the type of account register that comprises a casing and movable leaves or frames and appropriate apparatus constituting a cabinet, for filing and preserving credit account bills or slips for keeping account of credit sales without the use of books, or for filing other commercial papers for future reference, the invention having reference more particularly to the leaves or frames and to the means for connecting the leaves together and supporting them in the casing.

An object of the invention is to provide improved means for connecting the leaves together so that they may be moved pivotally and be supported normally in upright position in echelon and permit the leaves to be formed collectively into a rectangular pack. A further object is to provide improved means whereby the leaves or frames may be supported and also connected together without the necessity of employing separate adjustable hinging connections between them, and permit the leaves to normally stand in echelon or to lie in prone position in the form of a rectangular pack.

A further object of the invention is to provide improved construction in credit account registers that shall be simple, relatively inexpensive and durable and economical in use.

The present invention consists in a plurality of leaves or frames, a plurality of movable echelon blocks to which the leaves or frames are pivotally connected for normally supporting the leaves uprightly in echelon, the leaves or frames having pivotal and also sliding connections with the rearward adjacent blocks for moving the leaves or frames forward so as to form them into a rectangular pack, the body portions of the leaves or frames preferably being detachable from their pivoted portions. And the invention consists further in the novel parts and in the combinations and arrangements of parts as hereinafter particularly described and claimed.

Referring to the drawings, Figure 1 is a front elevation of an account register or filing cabinet constructed substantially in accordance with the invention; Fig. 2, a sectional elevation approximately on the line A A in Fig. 1; Fig. 3, a fragmentary sectional elevation also on the line A A but with the filing leaves or frames in prone position; Fig. 4, a fragmentary sectional elevation approximately on the line B B in Fig. 1 with different leaves or frames in different positions; Fig. 5, a fragmentary section on the plane of the line D D in Fig. 1; Fig. 6, a perspective view of one of the improved echelon blocks; Fig. 7, a perspective view of one of the echelon blocks slightly modified; Fig. 8, a fragmentary sectional elevation on the plane of the line F F in Fig. 4; Fig. 9, a fragmentary section on the line I I in Fig. 4; and Fig. 10, a fragmentary section approximately on the line J J in Fig. 4.

Similar reference numerals or characters in the different figures of the drawings indicate like elements or features of construction herein referred to and described.

A practical embodiment of the invention includes a casing constituting a part of the register or cabinet which may be varied in construction as may be desired, the casing suitably comprising a bottom 1, an upright back 2, two upright sides 3 and 4 from which extend relatively low portions 5 and 6 respectively, a front 7, a top 8 and a drawer 9, the forward portion of the casing being desk-like in form and suitable for supporting the forward portions of the leaves or frames when the latter are in prone position. A foundation rail 10 is suitably supported in the casing at the rear end of the top 8, being at suitable distances from the bottom 1 and the back 2. A base plate 17 is suitably secured upon the rail 10 and the forward portion thereof has two pivot stands 20 and 21 thereon adjacent to which two rearwardly inclined guides 22 and 23 are fixed on the plate. The rearward portion of the plate has two posts 24 and 24' thereon provided with rollers 25 and 25' respectively.

As illustrating the invention a limited number of leaves or frames are illustrated, there being a front leaf body portion 26, a suitable number of intermediate body portions 26' and a rear body portion 26'' provided respectively with hinge bars 27, 27' and 27'' which preferably are permanently mounted in the casing and have the body portions detachably or otherwise suitably secured thereto. Each body portion is provided with a suitable number of spring clamps 28, 28', or other suitable devices for removably securing bill slips or other papers to the body portions. The normally lower forward portion of each hinge bar is provided with two hinging ears 29 and 29' and the ears of the forward hinge bar are connected by means of pivots 30 and 30' to the pivot stands 20 and 21 respectively, the ears of the remaining hinge bars being provided with pivots 31 and 31' respectively. The forward hinge bar and each intermediate hinge bar are each provided with two pivot pins 32 and 32' that project from opposite ends of the bar near the rearward side of the bar.

The improved echelon blocks 33 and 34 are of right and left hand design but otherwise substantially alike and arranged in pairs and connected together at their rearward ends by means of a tie bar 35, as are also a pair of blocks 33' and 34' slightly modified for the rearward leaf or frame. The normally forward end portion of each echelon block has a pivot hole 36 therein to receive the pivots 31 and 31' whereby two echelon blocks are pivotally connected to the forward portion of each excepting the foremost one of the hinge bars. The forward portions of the two echelon blocks of each pair have flat leaf seats 37 and 37' thereon respectively that are always maintained in horizontal position if it is designed that the leaves shall stand in exactly vertical arrangement, but if it is preferred that the leaves lean slightly rearward the seats obviously will be slightly inclined correspondingly. The outer side of the blocks 33 and 34 have rearwardly inclined guides 38 and 38' thereon adjacent to the seats, the guides being unnecessary but are permissible on the blocks 33' and 34'. The two blocks of each pair have inclined guideways 39 and 39' respectively, and the rearward portions of the blocks have lateral guide pins 40 and 40' preferably provided with rollers 41 and 41'. The guideways 39 and 39' receive the rollers 25 and 25' or 41 and 41' whereby the rear portions of the blocks are movably supported, the rollers on the echelon blocks movably supporting the next upper adjacent blocks thereon. The forward portions of the blocks have bearing portions 42 and 42' respectively which project forwardly beyond the ends of the blocks, and in which are guide slots 43 and 43' that are vertical or at right angles to the leaf seats, and the slots receive the pivots 32 and 32' respectively of a hinge bar, so that the pivots rotate and also slide vertically in the slots, the blocks therefore serving to connect the leaves or frames together so as to afford relative pivotal movement of the leaves and also permit the leaves to stand in echelon upon the leaf seats, without entailing undue friction incident to adjustable hinges heretofore employed. The upper forward portions of the leaves have index characters 44, 44' thereon as is customary so that any leaf desired may be selected and drawn forward to prone position. The bearing projections 42 and 42' are movably supported upon the guides 22 and 23 or 38 and 38', and it is obvious that various anti-friction devices may be provided if desired for the bearing projections.

In practical use the papers required to be filed for preservation are placed upon the leaves or frames and secured thereto by such means as may be provided, and when it is desired to gain access to the papers on any one of the leaves or frames, such leaf and others that may be in front of it are drawn forward to prone position, and if desired other leaves may also be drawn forward, or one or more of those in prone position may be moved up to normal position. Obviously all the leaves may be drawn forward to prone position simultaneously. When the leaves are in normal position they stand uprightly on their seats by force of gravity, and when the leaves are drawn forward each leaf draws a pair of the echelon blocks forward, so that when all the leaves are in prone position the blocks are in vertical alinement one above another.

Having thus described the invention, what is claimed as new is:—

1. A filing frame pivotally supported and having two pivots extending from opposite sides thereof, two echelon blocks movably supported and having vertical guide slots respectively receiving the two pivots, and another frame pivotally connected to the two blocks.

2. A filing appliance including a filing leaf, two echelon blocks pivotally connected at one end to the leaf and having each a guide slot beyond said pivotal connection, and a pivotally supported leaf having two pivots on opposite sides thereof extending into the guide slots of the two blocks respectively.

3. A filing appliance including guides, two echelon blocks movably supported on the guides and having two vertical guide slots therein respectively, a leaf or frame pivotally supported and having two pivots extending into the two slots respectively, and another leaf or frame pivotally connected to the two echelon blocks.

4. A filing appliance including a plurality of filing leaves arranged face to face, and a plurality of movably guided echelon blocks, each block having connection with two adjacent leaves for relative pivotal movement and normally supporting one of the leaves independently of the connections of the block with the leaf and the adjacent leaf.

5. A filing appliance including guides, two echelon blocks movably supported on the guides and having each a vertically arranged guideway in the forward portion thereof, a hinge bar pivotally supported and having two pivots extending into the guideways respectively, the bar having a filing leaf body thereon, and another hinge bar pivotally connected to the two echelon blocks adjacent to the guideways and having a filing leaf body thereon.

6. A filing appliance including guides, two echelon blocks movably supported on the guides respectively and having each an approximately vertical guide on its forward portion, the forward portions of the blocks being supported below the vertical guides, a filing leaf or frame pivotally supported and having two connecting devices thereon that have pivotal and also vertically movable connection with the vertical guides respectively, and another filing leaf or frame connected to the two echelon blocks.

7. A filing appliance including a filing leaf, two inclined echelon blocks pivotally connected at one end to the leaf, a pivotally supported leaf having two pivots extending from opposite sides thereof, and means movably connecting the two pivots with the two echelon blocks respectively to enable the pivots to move vertically relative to the blocks and also move the blocks in an inclined plane.

8. A filing appliance including a pivotally supported front filing leaf, a plurality of movably guided echelon blocks, a plurality of filing leaves pivoted respectively to the plurality of echelon blocks and normally seated uprightly thereon to be supported thereby independently of their pivots, and means respectively connecting the leaves excepting the rear leaf with the rearward adjacent echelon blocks for moving the blocks on pivotal movement of the leaves.

9. A filing appliance including a plurality of filing leaves or frames comprising each a hinge bar and a body portion connected to the bar, each bar being provided with a movable echelon block for independently supporting the bar in normally upright position, means for pivotally connecting the leaves or frames to the blocks, and means for connecting the blocks to adjacent hinge bars.

10. A filing appliance including a casing provided with a pivot and a plurality of movably supported echelon blocks, a plurality of hinge bars operatively connected with the blocks for moving the blocks, one of the bars being connected to the pivot, the remaining bars being directly pivoted to the blocks and normally seated and independently supported thereon, and a plurality of filing leaf body portions secured respectively to the plurality of hinge bars.

11. A filing appliance including a plurality of filing leaves normally arranged uprightly face to face, a pivotal support for the foremost one of the leaves, a plurality of movably supported echelon blocks pivoted respectively to the remaining leaves, and being slidingly pivoted to the forward adjacent leaves respectively for moving the blocks on pivotal movement of the leaves and permitting longitudinal movement of the leaves relatively one to another.

12. A filing appliance including a plurality of movably supported echelon blocks having relatively fixed guide elements respectively, a plurality of filing leaves normally arranged uprightly, the foremost one of the leaves being pivotally supported, the remaining leaves being seated upon and pivoted to the echelon blocks, all excepting the rearmost one of the leaves having guide devices respectively in sliding connection with the guide elements for moving the blocks on pivotal movement of the leaves.

13. A filing appliance including a plurality of movably supported echelon blocks having each a vertically extending guide slot, and a plurality of filing frames normally arranged uprightly face to face, the foremost one of the frames being pivotally supported, the remaining frames being pivoted respectively to the echelon blocks, all excepting the rearmost one of the frames having pivots extending respectively into and movable in the slots of the rearward adjacent echelon blocks for moving the blocks.

14. A filing appliance including a plurality of movably guided echelon blocks arranged in echelon, a plurality of normally upright leaves arranged face to face, the foremost one of the leaves being pivotally supported, the remaining leaves being seated respectively upon the blocks and pivoted thereto, all excepting the rearmost one of the leaves being movably connected relatively and also pivotally with the rearward adjacent blocks respectively for movement of the blocks on pivotal movement of the leaves.

In testimony whereof, I affix my signature in presence of two witnesses.

ELLIS T. SILVIUS.

Witnesses:
P. A. HAVELICK,
J. H. GARDNER.